(12) United States Patent
Perrot et al.

(10) Patent No.: US 7,843,957 B2
(45) Date of Patent: *Nov. 30, 2010

(54) METHOD FOR MANAGING A COMMUNICATION NETWORK COMPRISING WIRELESS LINKS WITH MORE THAN TWO WIRELESS DEVICES

(75) Inventors: Sébastien Perrot, Rennes (FR); Gilles Straub, Acigné (FR); Nathalie Thomas, Chantepie (FR)

(73) Assignee: Thomson Licensing, Boulogne-Billancourt (FR)

( * ) Notice: Subject to any disclaimer, the term of this patent is extended or adjusted under 35 U.S.C. 154(b) by 1364 days.

This patent is subject to a terminal disclaimer.

(21) Appl. No.: 10/478,489

(22) PCT Filed: May 24, 2002

(86) PCT No.: PCT/EP02/05710

§ 371 (c)(1),
(2), (4) Date: Nov. 21, 2003

(87) PCT Pub. No.: WO02/098061

PCT Pub. Date: Dec. 5, 2002

(65) Prior Publication Data

US 2004/0157596 A1 Aug. 12, 2004

(30) Foreign Application Priority Data

May 29, 2001 (EP) ................... 01113124
Jun. 19, 2001 (EP) ................... 01114695

(51) Int. Cl.
*H04L 12/42* (2006.01)
*H04W 4/00* (2009.01)

(52) U.S. Cl. ...................... 370/452; 370/338

(58) Field of Classification Search ............. 370/255, 370/419, 421, 338, 451, 329, 389, 254, 446, 370/422, 350, 503, 328, 401; 455/445, 524, 455/507, 446; 709/220–226; 710/301–304, 710/104

See application file for complete search history.

(56) References Cited

U.S. PATENT DOCUMENTS 6,026,303 A * 2/2000 Minamisawa ............... 455/446

(Continued)

FOREIGN PATENT DOCUMENTS

EP 1246402 10/2002

OTHER PUBLICATIONS

"Broadband Radio Access Networks (BRAN); HIPERLAN Type 2; Packet Based Conergence Layer; Part 3: IEEE 1394 Service Specific Convergence Sublayer (SSCS)", ETSI TS 101 493-3 V1.1.1., Sep. 2000, pp. 1074.

(Continued)

*Primary Examiner*—Hanh Nguyen
(74) *Attorney, Agent, or Firm*—Robert D. Shedd; Joseph J. Opalach; Jerome G. Schaefer

(57) ABSTRACT

The invention concerns a method for managing resets in a communication network comprising wireless devices connecting busses over a wireless link, comprising the steps of: electing a parent wireless device among the wireless devices of the network, other wireless devices being labeled child wireless devices; having a first child wireless device send a bus reset message to the parent wireless device further to a reset on the child wireless device's local bus; having the parent wireless device spread the bus reset to other child wireless devices; having the other child wireless devices perform a bus reset on their local wired bus.

8 Claims, 3 Drawing Sheets

U.S. PATENT DOCUMENTS

| | | | |
|---|---|---|---|
| 6,691,173 B2 * | 2/2004 | Morris et al. | 709/249 |
| 6,711,409 B1 * | 3/2004 | Zavgren et al. | 455/445 |
| 6,876,643 B1 * | 4/2005 | Aggarwal et al. | 370/338 |
| 6,917,970 B2 * | 7/2005 | Jay et al. | 709/220 |
| 7,275,255 B2 * | 9/2007 | Suda et al. | 725/80 |
| 7,433,341 B2 * | 10/2008 | Perrot et al. | 370/338 |
| 2004/0023616 A1 * | 2/2004 | Straub et al. | 455/3.05 |
| 2004/0057411 A1 * | 3/2004 | Straub et al. | 370/338 |
| 2006/0050656 A1 * | 3/2006 | Perrot et al. | 370/255 |

OTHER PUBLICATIONS

Search report dated Apr. 11, 2003.

* cited by examiner

| nb_of_self_ID_packets (6) | reserved (10) |
|---|---|
| self-ID packet peer Wbox ||
| self-ID packet peer device #1 ||
| ⋮ ||
| self-ID packet peer device #n ||

METHOD FOR MANAGING A COMMUNICATION NETWORK COMPRISING WIRELESS LINKS WITH MORE THAN TWO WIRELESS DEVICES

This application claims the benefit, under 35 U.S.C. §365 of International Application PCT/EP02/05710, filed May 24, 2002, which was published in accordance with PCT Article 21(2) on Dec. 5, 2002 in English and which claims the benefit of European patent application No. 01113124.0, filed May 29, 2001 and European patent application No. 01114695.8, filed Jun. 19, 2001.

BACKGROUND OF THE INVENTION

1. Field of Invention

The present invention relates to implementing links formed by more than two interfaces in a communication network.

2. Related Art

The patent application EP 01400826.2, filed in the name of THOMSON multimedia on Mar. 30, 2001 defines the behavior of devices acting as interfaces between clusters of devices over a wireless link. According to the embodiment of this patent application, each link is formed by two interface devices, called 'wireless devices', connected to their respective cluster. In the embodiment of the cited patent application, a cluster is formed around a wired IEEE 1394 bus, and mainly links comprising two interfaces are discussed. Wireless devices as described in the embodiment of the patent application cited above implement part of the Hiperlan 2 Data Link Control (DLC) layer, and functions of the Hiperlan 2 IEEE 1394 Service Specific Control Sublayer (SSCS).

The present invention concerns the problem of implementing links formed by more than two interface devices.

Bridges between two IEEE 1394 busses are currently being standardized by IEEE. The corresponding draft standard is:

(1) IEEE P1394.1 "Draft Standard for High Performance Serial Bus Bridges" Draft 0.14, Dec. 21, 2000.

ETSI is also working on the standardization of an IEEE 1394 Service Specific Convergence Sublayer and on an IEEE 1394 Bridge Specific Functions sublayer:

(2) 'Broadband Radio Access Networks (BRAN); HIPERLAN Type 2; Packet based convergence layer; Part 3: IEEE 1394 Service Specific Convergence Sublayer (SSCS), version 1.2.1A of January 2001. This document addresses the transport of IEEE 1394 traffic between Hiperlan 2 devices.

(3) Broadband Radio Access Networks (BRAN) HIPERLAN Type 2 Technical Specification; Packet based Convergence Layer, Part 4: IEEE 1394 Bridge Specific Functions sub-layer for restricted topology, version 1.1.1 (July 2001).

It is to be noted that documents (2) and (3) describe architectures in which the wireless medium is represented as an individual, separate bus compared to the busses interconnected by the bridge, each individual bus being identified by a unique bus identifier, and each node of the network being defined by the identifier of its local bus and a own identifier, called physical identifier. In other words, the bridges described by these two documents are not transparent.

The present invention on the other hand concerns transparent bridges, each node of the network believing it is on a same, single bus with all other nodes of the network.

BRIEF SUMMARY OF THE INVENTION

The invention concerns a method for managing resets in a communication network comprising wireless devices connecting busses over a wireless link, comprising the steps of:

electing a parent wireless device among the wireless devices of the network, other wireless devices being labeled child wireless devices;

having a first child wireless device send a bus reset message to the parent wireless device further to a reset on the child wireless device's local bus;

having the parent wireless device spread the bus reset to other child wireless devices;

having the other child wireless devices perform a bus reset on their local wired bus.

BRIEF DESCRIPTION OF TILE DRAWINGS

Other characteristics and advantages of the invention will appear through the description of a non-restrictive embodiment, explained with the help of the attached drawings among which:

INTRODUCTION

As mentioned before, the patent application EP 01400826.2, filed in the name of THOMSON multimedia on Mar. 30, 2001 describes two-portal links. It is used as a basis for the present application and should be referred to when not indicated differently by the present application.

It will appear that many of the principles described in the former patent application also apply to the case of multipoint links which are the object of the present application.

The following documents give background information for the particular embodiment of the invention.

(a) IEEE Std 1394-1995 'Standard for a High Performance Serial Bus (b) IEEE Std 1394a-2000 'Standard for a High Performance Serial Bus—Amendment 1'

(c) IEC 61883-x (1998-02) Consumer audio/video equipment—Digital interface, where 'x' varies between 1 and 5.

Document (c) defines in particular the creation of isochronous connections over an IEEE 1394 bus.

(d) IEEE P1212 'Draft Standard for Control and Status Registers (CSR) Architecture for microcomputer busses'

Reference is also made to document (2) cited in the introduction, since the present embodiment uses part of the functions specified by this document.

Of course, the invention is not limited to the particular technologies chosen for the wired bus or the wireless link.

DETAILED DESCRIPTION OF PREFERRED EMBODIMENTS

Figure 1:
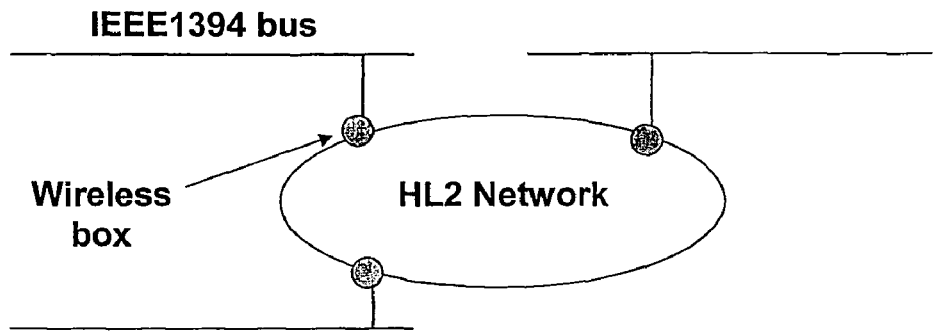
FIG. 1 is a diagram of a network comprising a wireless link formed by three wireless devices according to the invention.

In the embodiment, an interface device between a wired IEEE 1394 bus or a sub-network and the wireless medium will be called 'wireless box' or 'wireless box'. According to the present embodiment, the association of wireless devices ('wireless box') is not limited to two. More than two wireless boxes can associate, as illustrated by the bridge of FIG. 1, which comprises three wireless boxes.

Each wireless box implements the HiperLAN2 data link control layer (DLC) and major parts of the IEEE 1394 SSCS layer. The busID is not used for the routing, as the busID is the same for all clusters.

Figures 4, 5:
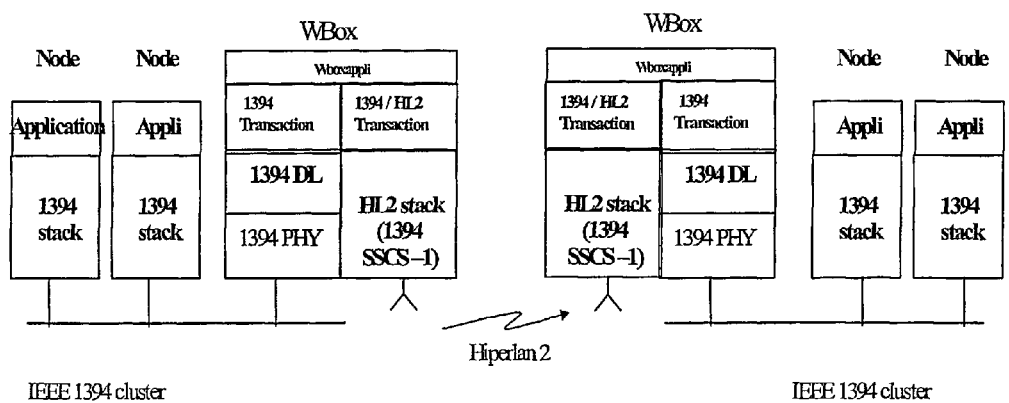
FIG. 4 is a diagram of a bus reset register as used in the present embodiment.
FIG. 5 illustrates an example of the software layers in wireless boxes and nodes of the clusters.

The bridge layer as defined by document (g) is not implemented; instead, an application that the transparent bridge behavior. FIG. 5 illustrates the software layers in the wireless boxes and the nodes.

The present embodiment defines a transparent bridge, as in the patent application previously cited: the IEEE 1394 nodes located on the buses see each other as being located on the same bus.

There are two types of busses: one or more leaf busses, and at most one branch bus. A leaf bus can only be connected to a branch bus. Several leaf busses can be connected to the same (unique) branch bus.

The notion of 'version' of a wireless box is introduced. The "point to point capable" wireless boxes, will be referred to as 'version 1' boxes and the wireless boxes capable of communicating with more than one other wireless box will be referred to as 'version 2' boxes.

Both versions of the wireless boxes can work together. A version 1 wireless box and a version 2 wireless box can be connected to the same bus (i.e. the branch bus of the point-to-point 'branch and leaf' topology). On a particular wireless link, there may be only one given version of wireless boxes.

Only one bus (i.e. the branch bus) can at the same time receive both versions of wireless boxes.

Unless otherwise specified, the behavior of the wireless boxes described in what follows is that of version 2 boxes, while version 1 boxes behave as specified in the patent application cited in the introduction. Mainly the difference in behavior between version 2 boxes and version 1 boxes will be described.

Figure 2:
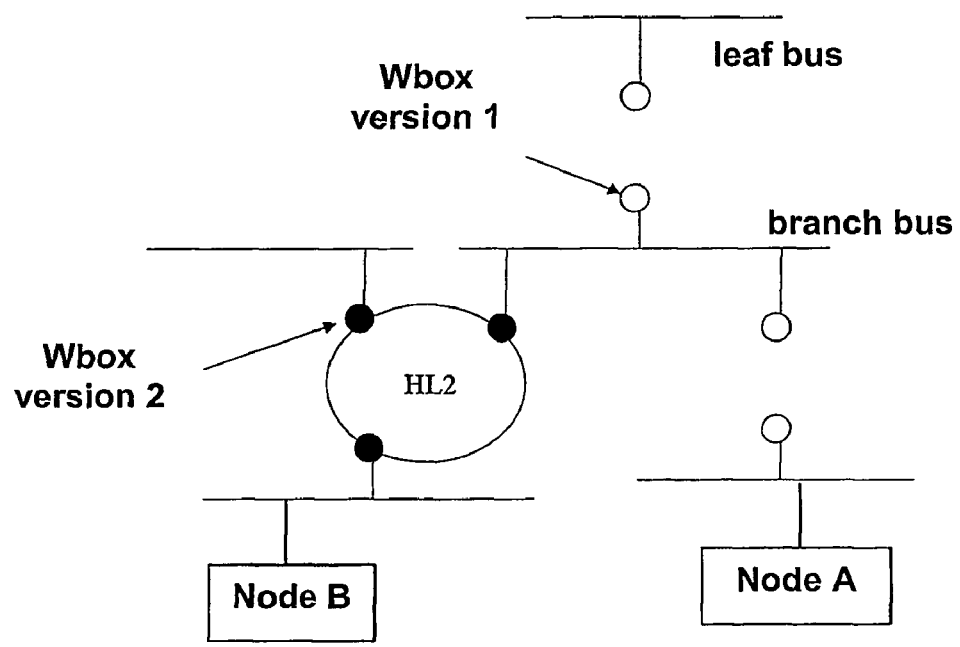
FIG. 2 is a diagram of a network comprising several different types of wireless devices.

FIG. 2 is an example of a network comprising both versions of wireless boxes. Version 1 boxes are shown as white circles, while version 2 boxes are shown as black circles.

Multipoint Link Architecture

The architecture of the multipoint link will now be described.

As mentioned above, all wireless boxes see each other through the wireless network. According to the present embodiment, one of them has a particular role, which will be used among other things to determine bus reset propagation in the multi-point link. On its local bus, from the topological point of view, this wireless box is connected to a wired IEEE 1394 device through the particular wireless boxes' parent port. All the other wireless boxes are logically connected to its child ports, in a manner analogous to that described in IEEE 1394 1995 (document (a)), part 3.7.3.1.2.

By analogy to IEEE 1394-1995, this particular wireless box will be called the parent wireless box in what follows, while the other wireless boxes will be called child wireless boxes.

According to the present embodiment, the number of wireless boxes is limited to sixteen for each wireless link. This corresponds to the total number of ports of an IEEE 1394 device, as defined in IEEE 1394-1995, part 8.5.1. The wireless box acting as the parent can be connected to fifteen child wireless boxes.

The election of the parent wireless box is done at the time of association of the different wireless boxes with the central controller of the wireless network, and after each IEEE 1394 SSCS bus reset. At SSCS bus reset, as described in document (2), each wireless box is allocated a physical identifier (no-de_id). According to the present embodiment, the wireless box with the highest node_id is generally chosen as the parent wireless box. The parent-child hierarchy will be used to organize the self-id process among wireless boxes and the busses or sub-networks of which they are part.

The parent election can be summarized as follows:
First step: connection of two wireless boxes:
the one which is not root on its bus is the parent wireless box;
If both are root, the one which has the higher nodeID becomes the parent wireless box.
Second step: connection of another wbox.
Already connected wireless devices are all root on their bus
If the new one is not root, then it shall be the parent wireless box
If the new one is also root, then the parent remains the same.
One of the already connected devices is not root
The new one shall be root and the parent wireless box remains the same (i.e. the wireless box which was not root).

A wireless box can be associated with the wireless network's central controller in the sense of HiperLAN2 but not 'linked'—in the sense of the present embodiment—to other wireless boxes because of topology restrictions (e.g. maximum number of nodes or hops, avoidance of loops . . . ). In such a case, the nodes connected to that wireless box are not visible to other nodes on the network and vice-versa. Such an associated, but in fact topologically isolated wireless box may not become the parent wireless box: even if they are allocated a PHY_ID, they are not included into the topology of the bus.

Figure 3:
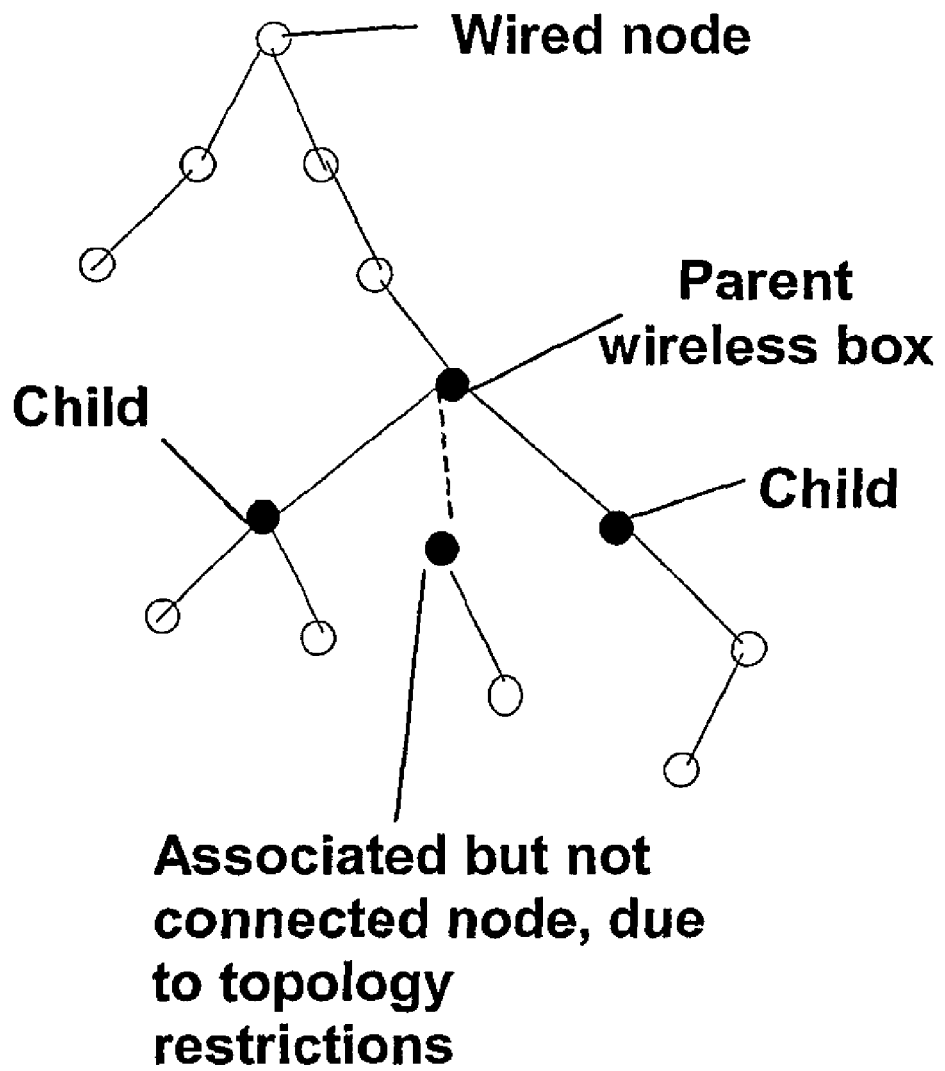
FIG. 3 is a diagram of the network of FIG. 1 and a representation of a corresponding topology.

FIG. 3 shows a topological representation of the three busses of FIG. 1. For the sake of simplicity, this network only comprises version 2 wireless boxes. The parent wireless box is connected to the other wireless boxes through its "child" ports. The child wireless boxes are connected to the parent by their "parent" port.

Association Process

The association process of a new wireless box to an existing wireless network comprising two already connected wireless boxes is as follows:

The first step of the association procedure allows all the wireless boxes of version 2 to be notified of the arrival or the leaving of another wireless box on the wireless medium. It is described in document (2), part 6.4 (bus reset procedure): when a wireless box joins the network, a radio link control layer (rlc) association procedure is performed with the Central Controller of the HiperLAN network. Whether a wireless box has been added or removed, the SSCS bus reset procedure is performed, as detailed in the same document. The SSCS bus reset is distinct from any of the IEEE 1394 bus resets and their propagation.

The second step of the association procedure consists in checking whether a new wireless box and its associated IEEE 1394 bus or sub-network meet the requirements of the overall network topology. The new wireless box checks these conditions by verifying that:
There is only one branch bus in the existing network.
Only one of the wireless boxes is not root on its local bus.
The total number of devices on the existing network, to which is added the number of devices on the new bus/sub-network is limited to 64. This corresponds to the maximum number of PHY_id identifiers on a single wired IEEE 1394 bus.

The number of nodes present on the rest of the network can be requested by the new wireless box from the parent wireless box, or from another wireless box, by reading information concerning the network topology of the network, this information being maintained by each wireless box. Alternatively, the new wireless box includes in its bus reset message to the parent wireless box the number of nodes on its local bus, and it is the parent wireless box that determines whether the total number of nodes is greater than 64 or not.

The limitation to 64 nodes has also to be checked when a device is connected to a bus which is already connected to the network. The wireless box of that bus already has the former topology of the network in memory, and checks whether the node number limitation is satisfied or not. If it is not satisfied, it does not forward the bus reset message and it generates a disconnection from the network. It nevertheless remains associated at the Radio Control Layer level, and when a device is removed, tries to connect again. It can also verify at certain moments—for example periodically—with the parent wireless box whether changes in the rest of the network topology (e.g. a diminution of the number of devices, on one bus, or the removal of a whole bus) may authorize the connection of the bus In what follows, unless specified otherwise, the different steps are carried out as described in the patent application cited in the introduction.

We suppose that the network contains N wireless boxes:

(a) N−1 wireless boxes are to be roots on their respective busses, in order to allow proper reset propagation. These are the wireless boxes that have their IEEE 1394 SSCS operating as wireless cycle slave;

(b) The one wireless box that is not root is located on the bus that contains the global root, i.e. the root of the 'virtual' IEEE 1394 bus constituted by all devices of the network. It can also be root (and becomes in this case the global root). This wireless box acts as wireless cycle master for the wireless network, in order to synchronize wireless devices and wireless boxes, as defined by document (2).

If the linking of the new wireless box is allowed, the parent wireless box is (re)elected, if necessary. Then a bus reset is performed as described below. The new wireless box can then build the topology map of the network. In the case of links limited to two wireless boxes (point-to-point) there are only two wireless boxes associated respectively with one of two busses. Here there are several busses: a new dimension is included in the association, linking and bus reset procedures. The new wireless box needs information from all the other wireless boxes to build its topology correctly. This information is obtained through the reset procedure defined below.

As described in document (2) (Section 6.5, Clock information connection control), all wireless boxes but the parent wireless box join the clock multicast group to synchronize on the wireless cycle master, which is the parent wireless box.

Connections are opened to map asynchronous transactions, as described in document (2), section 6.8.

When a wireless box leaves the network, an IEEE 1394 SSCS bus reset is also performed. It is initiated by the central controller that detected the removal of the wireless box, as described in document (2), section 6.4.

The parent wireless box can be elected or re-elected if necessary.

Reset Process:

A bus reset can be triggered through the removal or the adding of a node from or to any wired bus. It is also triggered when a wireless box is added or released. A wireless box connected to the wired bus will propagate the reset to other busses.

During the period of a bus reset, the transfer of data is suspended.

To trigger a reset, a wireless box sends a child bus reset message to the parent wireless box (if it is not itself the parent wireless box). The bus reset message may also be a write to a register, as illustrated by FIG. 4.

Nb_of_self_ID_packets specifies the number of 1394 devices on the bus requesting the bus reset (including the Wbox).

The format of a self-ID packet shall be the one defined in IEEE Std 1394-2000.

The parent wireless box then sends a parent bus reset message to all other wireless boxes.

The assumption is made that all wireless boxes are able to generate the topology of the network with the selfID packets from other devices of the network;

all wireless boxes are supposed to generate the same topology internally.

The procedure is as follows:

A wireless box detects a reset on its local bus. It participates in the bus reset on its bus, with its knowledge of the topology of the entire network. The IEEE 1394-1995 self identification procedure is carried out on this bus;

The wireless box of the previous step sends a child bus reset message—containing the list of self_ids corresponding to its bus—to the parent;

The parent sends a parent bus reset message to all children: it contains the self_ids of all the nodes of the IEEE 1394 busses except from the bus to which the child is attached;

Each child performs an IEEE 1394 bus reset on its bus, knowing the topology of the rest of the network, and sends an acknowledgement packet to the parent, containing the list of self_ids corresponding to its bus or subnetwork;

The parent sends an acknowledgement packet to the initiating child wireless box. It contains the self_id of all the nodes of the IEEE 1394 network.

A reset on the initiating bus may be required under certain conditions (e.g. when the reset was triggered because of the connection of a new wireless box).

The bus reset procedure is then closed.

Each wireless box maintains a topology map of the network. It can then generate self_ids for remote nodes on its local bus. Depending on the device that left, a wireless box generates the same self_id as the one defined in the remote bus from which a device was removed. When a device leaves a bus, all wireless boxes are able to generate the correct selfID with regard to the new topology.

If a bus reset occurs in another bus when the reset procedure is going on, the wireless box attached to the bus sends the modified topology through the acknowledgment packet. The parent is then able to detect that a bus reset occurred and continue the bus reset procedure accordingly. If the acknowledgment packet has already been sent, the wireless box attached to the bus sends a child bus reset message and the parent starts a new bus reset procedure.

Reservation of Isochronous Resources:

The isochronous resource reservation is the same as in the patent application cited in the introduction, with the following difference.

The isochronous resource manager (IRM) defined in document (2) is used. It provides a single location where the isochronous control features (channel and bandwidth available) are registered.

Instead of opening a dedicated user connection ('duc'), as defined in the patent application cited in the introduction, wireless boxes join isochronous multicast groups, as defined in document (2).

When a wireless box detects a lock request in an input or output plug control register (i/oPCR) of a node on its local bus, it checks whether it is necessary to reserve an isochronous channel on the wireless link, the wireless box acts as an IEEE 1394 controller, which is defined in document (2), section 6.9.1.

After a bus reset, each wireless box reads all plug control registers that were previously allocated for connections for which the wireless box was the IEEE 1394 controller before the reset to check if these registers are still allocated, even after the reset. If they are not (e.g. a source device has been removed), the corresponding channel reservation is cancelled.

Non-overlaid connections are treated as follows by the wireless boxes:

It is supposed that an IEEE 1394 controller has performed oPCR and iPCR lock requests on the control plug registers of a talker node and of a listener node. These nodes respond with an appropriate response message. Wireless boxes forward oPCR and iPCR lock responses to the other wireless boxes of their link ('peer' wireless boxes').

When a wireless box receives an oPCR lock response from a talker node through one of its peer wireless boxes, it deduces that the talker node is on the side of one of its peer wireless boxes. The oPCR lock response contains the channel number allocated by the isochronous resource manager for the connection. The wireless box will thus only need to make a reservation if it finds that the listener node for this connection is on its own side of the network or on the side of one of the other peer wireless boxes. To determine this, it listens also to iPCR lock responses.

The wireless box is certain that the listener node is not on its side of the network if it also receives the iPCR lock response with the same channel number from one of its peer boxes. If it comes from the same peer wireless box as the oPCR lock response, no reservation of wireless resources is made. If it comes from another peer wireless box, reservation of wireless resources is necessary.

The wireless box is certain that the listener node is on its side of the bus when it detects an iPCR register in any node on its side of the network, the iPCR register bearing the same channel number as that in the oPCR.

To determine this last condition, the wireless box carries out a process, which consists in reading, at certain intervals, iPCR registers of nodes on its side of the network, looking for the appropriate channel number.

If the listener node corresponding to the oPCR lock response is found on its side of the wireless link, or if the wireless box receives an iPCR lock response from another peer wireless box then the wireless box makes the necessary isochronous resource reservations. In such a case, a wireless box sets up a special register for the connection. This register, called wPCR, for 'wireless' plug control register, is detailed in the patent application cited in the introduction. It contains among other data a point to point connection counter which is set to '1' by the wireless box. The peer wireless box which has the talker node in its side of the network also creates a register and sets the connection counter to '1'.

In each case, only one wireless box of a link is triggered to make the isochronous resource reservation over the link. It is the wireless box located on the same side as the controller application. A wireless box knows that the controller is on its local bus if it detected a connection in an iPCR or oPCR register of a local node, or if it received a lock response addressed to one of its local nodes from one of its peers.

The mechanism is symmetric when the wireless box first receives an iPCR lock response.

For overlaid connections, the same process as described in the cited patent application applies. For breaking a non-overlaid connection, again the same procedure as in the cited patent application applies. All the wireless boxes maintain a wPCR register for each connection.

When a device breaks a connection, it leaves the multicast group as described in document (2), section 6.9.

Management of broadcast-in/broadcast-out connection is carried out as follows:

Broadcast-out and broadcast-in connections are unprotected. A connection can be broken by any application. The application that established the broadcast-out connection has no guarantee that the output plug will continue the transmission of the isochronous data flow. The application that established the broadcast-in connection does not know whether there is an output plug transmitting an isochronous data flow on the channel that the input plug uses to receive and, if there is, that the output plug will continue the transmission.

Opening a broadcast-in or broadcast-out connection is carried out as follows:

Each wireless box regularly polls nodes of its bus to detect broadcast out connections. It reads the oPCR registers of the nodes on its bus to detect if the broadcast connection counter is set. Then it forwards the information to its peers of the link along with the corresponding channel number. The peers poll the nodes to find a broadcast-in connection corresponding to that channel.

Once a broadcast-in connection is detected, an isochronous channel is opened over the wireless link by the wireless box which detected the broadcast in connection on its bus.

Releasing a broadcast-in or broadcast-out connection is carried out as follows:

The wireless box located on a broadcast-out connection side regularly reads the oPCR register corresponding to that broadcast-out connection to check if the broadcast-out connection is still active. When it is not active any longer, the connection is released.

A wireless box located on a broadcast-in connection side regularly reads the iPCR register(s) to check if the broadcast-in connection is still active. When it not active any longer, it reads all the iPCR registers of the other nodes located on its side to check if there is another active broadcast-in connection for the same channel.

When there is no active broadcast-in connection left in the peer wireless boxes, the connection is released.

It is possible that the channel that is dedicated to the broadcast in and out connections is also used for isochronous transmissions. In that case, this channel is considered as an isochronous channel rather than a broadcast channel. The wireless boxes stop checking the oPCR and iPCRs.

When the i/oPCRs are no longer allocated, the wireless boxes resume the checking of the broadcast in and out connections as already explained.

In order to transmit packets, each wireless box maintains a topology map. It also maintains a routing table.

Constraints Linked to Timeout Issues in Split Messages

The number of wireless links between two IEEE 1394 devices may be limited, in order to respect timeout constraints for split transactions, as explained in the cited patent application. Of course, the invention is not limited to such a case.

The IEEE 1394 SSCS (document e) allowing relaying, a second wireless link can be added on the net. If the timeout constraints impose, for example, a maximum of two bus hops defined above, this then leads to the restriction that only one wireless box is allowed on each wired bus, since the relay may be the cause of having two hops on the wireless bus.

In configurations where different versions of wireless boxes are interconnected, the maximum number of wireless links on a path between two nodes can reach three instead of two. In FIG. 2 for example, the path between nodes A and B passes three wireless links. Nevertheless, there is still only one branch bus in the network, the branch bus being the one possessing more than one linked wireless box. The definition of a 'linked' wireless box is given below.

The invention claimed is:

1. A method for managing resets in a communication network comprising wireless devices connecting busses over a wireless link, comprising:
    electing a parent wireless device among the wireless devices of the network, other wireless devices being labeled child wireless devices;
    detecting, at a first child wireless device, a bus reset on said first child wireless device's local bus;
    having the first child wireless device send a bus reset message to the parent wireless device;
    having the parent wireless device sends a parent bus reset message to other child wireless devices;
    having the other child wireless devices perform a bus reset on said other child wireless devices' local wired bus.

2. The method according to claim 1, wherein for the purpose of generating the bus reset, the parent wireless device sends to each child device the self-ids of the nodes of the entire network, except the nodes connected to the child device's bus.

3. The method according to claim 1, wherein the bus reset message sent by the first child device contains self id packets of the nodes of this child device's bus.

4. The method according to claim 1, further comprising having the parent device send an acknowledge message to the first child device upon completion of the bus reset by the other child devices.

5. The method according to claim 1, wherein the busses are connected transparently as far as nodes connected to the busses are concerned, further comprising:
    associating a wireless device with a central controller of the wireless link;
    verifying whether the transparent connection of the wireless device results in an authorized network topology, and,
    if the transparent connection of the wireless device does not result in an authorized topology, forbidding the transparent connection, maintaining the association, and rechecking the network topology condition at certain moments to reinitiate connection.

6. The method according to claim 5, wherein the network topology condition is the total number of devices on the network.

7. The method according to claim 5, further comprising verifying the network topology condition when a new device is added on a bus which is already transparently connected to the network through a wireless device and disconnecting said bus if the resulting network topology is not authorized, but maintaining association.

8. The method according to claim 7, wherein the disconnected wireless device tries to connect again under one of the following conditions: the number of devices on said disconnected wireless device's bus has decreased or the number of devices on the rest of the network has decreased.

* * * * *